(12) United States Patent
Hester et al.

(10) Patent No.: US 10,209,511 B2
(45) Date of Patent: Feb. 19, 2019

(54) SPATIAL LIGHT MODULATOR FOR ACTUATING MICROELECTROMECHANICAL SYSTEMS (MEMS) STRUCTURES

(71) Applicants: C. Anthony Hester, Huntsville, AL (US); Charles F. Hester, Huntsville, AL (US)

(72) Inventors: C. Anthony Hester, Huntsville, AL (US); Charles F. Hester, Huntsville, AL (US)

(*) Notice: Subject to any disclaimer, the term of this patent is extended or adjusted under 35 U.S.C. 154(b) by 1442 days.

(21) Appl. No.: 14/023,119

(22) Filed: Sep. 10, 2013

(65) Prior Publication Data
US 2016/0377858 A1 Dec. 29, 2016

Related U.S. Application Data

(60) Provisional application No. 61/700,170, filed on Sep. 12, 2012.

(51) Int. Cl.
*G02B 26/08* (2006.01)

(52) U.S. Cl.
CPC .................. *G02B 26/0841* (2013.01)

(58) Field of Classification Search
CPC .... G02B 26/06; G02B 26/08; G02B 26/0808; G02B 26/0826; G02B 26/0825; G02B 26/0833; G02B 26/0841; B81B 3/0051
USPC ........ 359/198.1–199.4, 200.6–200.8, 202.1, 359/221.2, 223.1–225.1, 226.2, 904, 359/290–295, 838, 846, 871, 872; 250/204, 559.06, 559.29, 230, 234; 347/255–260; 353/39, 98–99; 385/15–18, 22; 398/12, 19, 45
See application file for complete search history.

(56) References Cited

U.S. PATENT DOCUMENTS

| | | |
|---|---|---|
| 5,311,360 A | 5/1994 | Bloom et al. |
| 5,459,610 A | 10/1995 | Bloom et al. |
| 5,510,824 A | 4/1996 | Nelson |
| 5,677,783 A | 10/1997 | Bloom et al. |
| 6,552,842 B2 | 4/2003 | Simpson et al. |
| 6,618,187 B2 | 9/2003 | Dilossof |
| 6,661,637 B2 | 12/2003 | McIntosh et al. |
| 6,856,448 B2 | 2/2005 | Fitzpatrick et al. |
| 7,027,161 B2 | 4/2006 | Trisnadi et al. |
| 2003/0015768 A1 | 1/2003 | Bosco et al. |
| 2004/0036950 A1 | 2/2004 | Hunter et al. |
| 2004/0212026 A1 | 10/2004 | Van Brocklin et al. |

(Continued)

OTHER PUBLICATIONS

Kim, S., et al., MEMS for Optical Functionality, Journal of Electroceramics, 2004, vol. 12.

(Continued)

*Primary Examiner* — Kimberly N. Kakalec
(74) *Attorney, Agent, or Firm* — Maynard Cooper & Gale, P.C.; Jon E. Holland

(57) ABSTRACT

A spatial light modulator is provided by positioning and repositioning micromirrors of a microelectromechanical system. The micromirrors are positioned by an actuator linked to the micromirrors by a frame. The actuator responds to a control signal having voltages that create electrical fields. The electrical fields provide forces that change the positions of the micromirrors in such a way that a light beam striking the micromirrors reflects as a modulated light beam.

27 Claims, 9 Drawing Sheets

(56) References Cited

U.S. PATENT DOCUMENTS

| | | | |
|---|---|---|---|
| 2006/0017689 A1* | 1/2006 | Faase | B81B 3/0008 345/108 |
| 2006/0115920 A1 | 6/2006 | Urano et al. | |
| 2006/0152794 A1* | 7/2006 | Yang | G02B 26/0841 359/291 |
| 2009/0127639 A1 | 5/2009 | Suzuki et al. | |
| 2010/0046052 A1* | 2/2010 | Mizoguchi | G02B 26/101 359/199.3 |

OTHER PUBLICATIONS

Mastrangelo, et al., "Suppression of Stiction in MEMS," Center for Integrated Microsystems, Department of Electrical Engineering and Computer Science, University of Michigan, pp. 1-12.

\* cited by examiner

SPATIAL LIGHT MODULATOR FOR ACTUATING MICROELECTROMECHANICAL SYSTEMS (MEMS) STRUCTURES

CROSS REFERENCE TO RELATED APPLICATION

This application claims priority to U.S. Patent Application No. 61/700,170, entitled "Closed Loop Controlled Spatial Light Modulator" and filed on Sep. 12, 2012, which is incorporated herein by reference.

RELATED ART

A typical spatial light modulator (SLM) modulates light by moving micromirrors, and such an SLM is often created using microfabrication techniques. Light modulators, such as an SLM, modulate light beams using amplitude modulation, phase modulation or both phase and amplitude modulation. Often SLMs are used as a component of a laser printer or other display devices, such as a projector. The performance specifications of an SLM are generally dependent on its application.

A conventional SLM that modulates light typically has a reflective deformable grating wherein the deformation of the grating is controlled electronically. The grating has one or more elongated elements with a light reflective planar surface. In addition, the grating serves as an electrode for receiving a control signal. The elongated elements extend from a fixed support structure or may be cantilever beams that are pulled by electric field forces generated by the control signal. Details of one such conventional SLM are described in U.S. Pat. No. 5,311,360, "Method and Apparatus for Modulating a Light Beam," issued on May 10, 1994. The frequency response of the SLM is dependent on physical and structural parameters of the grating and on the magnitude of an applied electric field. In general, a conventional SLM may have a frequency response of less than around 40 KHz. Techniques for improving the frequency response of SLMs are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
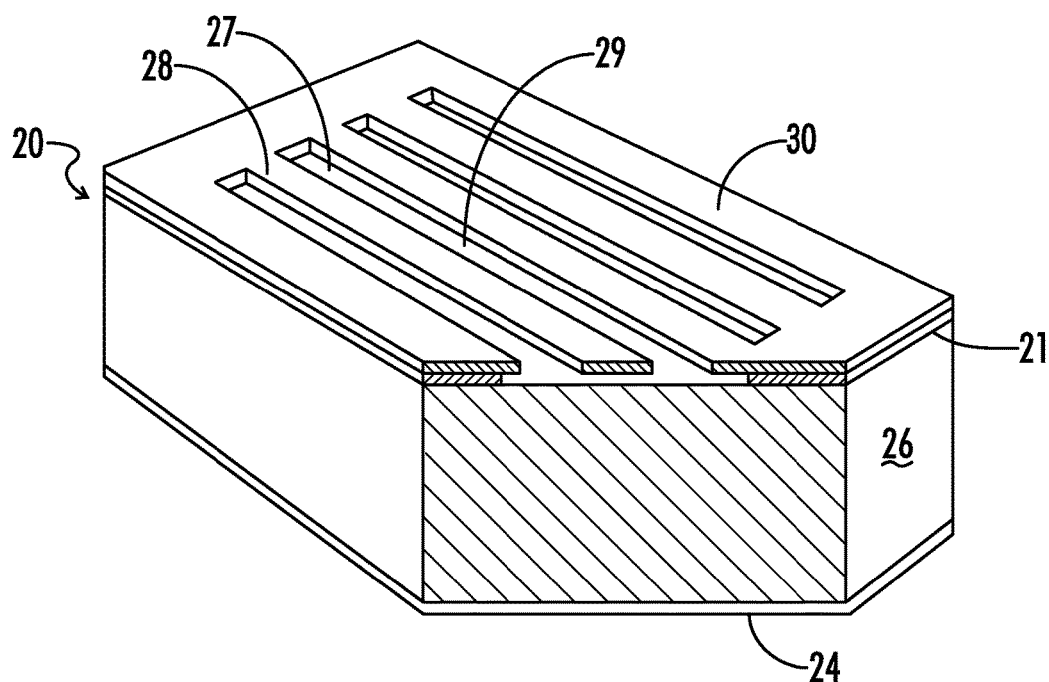
FIG. 1 depicts a conventional spatial light modulator.

A conventional spatial light modulator (SLM) 20 is depicted in FIG. 1. The conventional SLM 20 comprises a frame 30 attached to a substrate 26 by insulator 21 that extends around a perimeter of the SLM 20. The frame 30 has slots 27 between beams 28. The beams 28 are separated from a reflective top surface 29 of the substrate 26 by a space. The space, formed during fabrication, allows beams 28 to move downward, though by a limited amount, in response to an electric field force as will be seen. Each beam 28 has a reflective top surface for reflecting light of a light beam (not shown). Beams 28 also serve as electric plates that are coupled to a first potential (voltage) of a control signal. Aluminum foil 24 extends across the bottom of the substrate 26 and serves as another electric plate that is coupled to a second potential of the control signal 26. The beams 28 move in response to electric field forces generated by the control signal. When the control signal is a time-varying voltage, beams 28 move in response to the resulting time-varying electric field forces. Vertical movement (downward and upward) of the beams 28 results in amplitude modulation of the light beam directed towards the reflective surfaces of the conventional SLM 20. The frequencies of the amplitude modulated light beam are generally equal to the frequencies of the control signal, but such frequencies are often limited by the mechanical parameters of the beams 28. Additional details for the conventional SLM of FIG. 1 are described in U.S. Pat. No. 5,311,360, "Method and Apparatus for Modulating a Light Beam," issued on May 10, 1994.

The present disclosure generally pertains to SLM systems having relatively high frequency responses. In one embodiment, an SLM system modulates a light beam by moving micromirrors in response to forces from an actuator, which has a drive bar providing the actuator forces in response to a control signal. One or more frames, structurally coupling the actuator to the micromirrors, translate the actuator forces to forces that position and reposition the micromirrors. Each micromirror has a reflective surface, e.g., a planar surface coated with reflective material, which reflects the light beam. Further, each micromirror has a non-reflective surface that is coupled to the one or more frames.

The micromirrors often function as an element of a pixel, wherein multiple pixels form of an optical device that may display information or transfer light energy to other elements of an optical system. Each actuator provides forces, in response to a control signal, for a generally linear movement of the micromirrors, and the linear movement causes the micromirrors to modulate the light beam. The modulation may be amplitude modulation, phase modulation or a combination of both amplitude and phase modulation. Each micromirror can be moved separately to allow for independent control of phase modulation and amplitude modulation. That is, phase modulation may be controlled independently relative to amplitude modulation.

As will be described in more detail hereafter, exemplary embodiments of SLM systems have reflective components (sets of micromirrors) and electromechanical components for moving the reflective components. Both the reflective components and the electromechanical components can be formed using known microfabrication techniques. The reflective components move in response to voltages of a control signal that create electric field forces. When the electric field forces vary with time, the micromirrors respond with corresponding time-varying movements so that a light beam striking the moving micromirrors is reflected as a modulated light beam.

An exemplary embodiment of an actuator of the present disclosure comprises a substrate for supporting components of the actuator. The actuator comprises a drive bar having one or more edges for receiving forces for rotating the drive bar about its axle of rotation. In one exemplary embodiment, the actuator further comprises a force ribbon attached to the substrate and contacting one or more edges of the drive bar, wherein the force ribbon creates forces in response to a control signal. The actuator has one or more conductive elements (e.g., control plates) that generate electric fields in response to voltages of the control signal. The electric fields create Coulomb forces on the force ribbon, and such forces are time-varying forces when the control signal has time-varying voltages. Forces generated by the control signal are transferred from the actuator to the micromirrors through frames that couple the actuator to the micromirrors.

Figure 2:
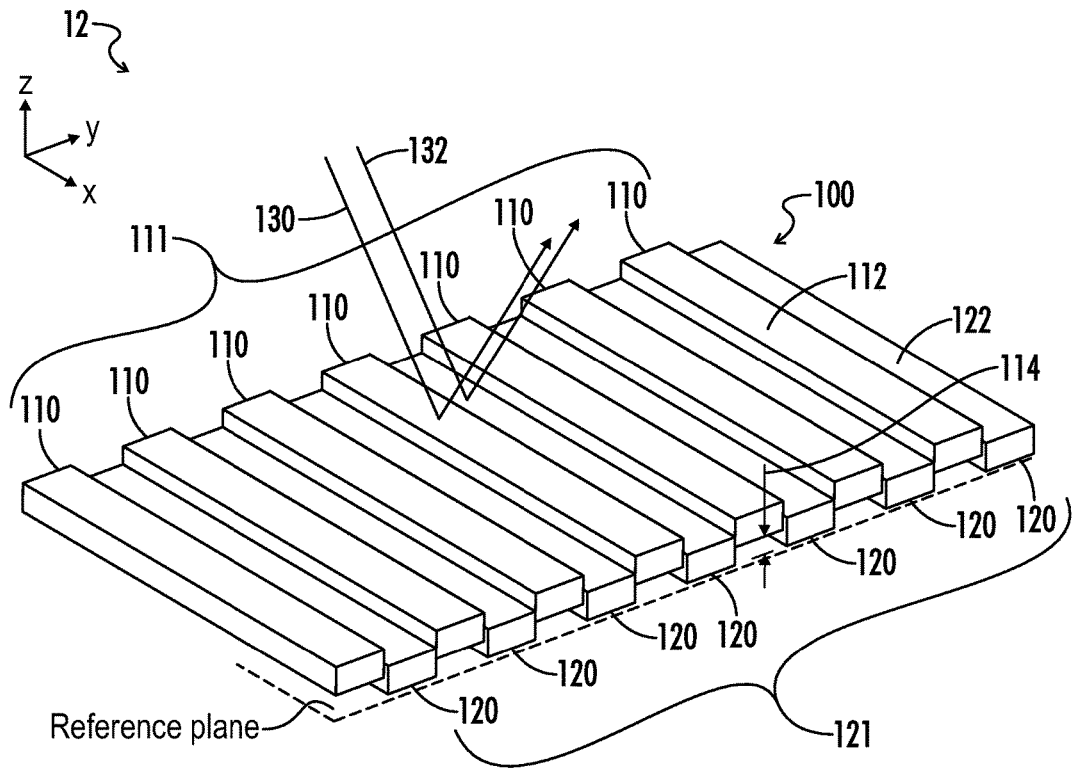
FIG. 2 depicts an exemplary arrangement of micromirrors for a spatial light modulation system in accordance with the disclosure.

FIG. 2 depicts an exemplary embodiment of an array 12 of micromirrors comprising a first set 111 of micromirrors interwoven with a second set 121 of micromirrors for an SLM system of the present disclosure. The first set 111 comprises a plurality of micromirrors 110 wherein each micromirror 110 has a reflective surface, and the second set 121 comprises a plurality of micromirrors 120 wherein each micromirror 120 has a reflective surface. Each micromirror within the same set moves in unison with respect to the other micromirrors of the set. The array 12 of micromirrors modulates a light beam directed towards the reflective surfaces of the micromirrors 110, 120 based on the relative positions of the micromirrors in the z-direction or the negative z-direction. Each of the micromirrors 110, 120 as depicted has a rectangular cross section and a length measured in the x-direction. Further, each micromirror 110, 120 has respective top surface 112, 122 coated with a reflective material. A bottom surface of each of the micromirrors 110 is coupled to a frame (not shown in FIG. 2), and a bottom surface of each of the micromirrors 120 is similarly coupled to a frame (not shown in FIG. 2). The micromirrors move in either the positive or negative the z-direction, in response forces applied to the frames. In one embodiment, the actuator (including the micromirrors and frames) are microfabricated in accordance with known microfabrication techniques and are microelectromechanical systems (MEMS) structures that can be batch fabricated.

The reflecting surfaces of the first set 111 of micromirrors define a first reflective plane and the reflecting surfaces of the second set 121 of micromirrors define a second reflective plane. As depicted in FIG. 2, the first reflective plane and second reflective plane are offset by an offset distance 114. When the first set 111 of micromirrors moves downward (the negative z-direction) by the depicted offset distance 114 to a new position so that the reflective surfaces of micromirrors 110, 120 are aligned, the micromirrors 110, 120 are coplanar. When the micromirrors 110, 120 are co-planar, the array 12 of micromirrors forms a single reflective plane.

For exemplary embodiments of the disclosure, the sets 111, 121 of micromirrors depicted in FIG. 2 are configured to move independently of each other in response to applied forces as will be seen. The movement of the sets 111, 121 of micromirrors may amplitude modulate or phase modulate a light beam reflected by the array of micromirrors 12. A light beam from a source (not shown) directed towards the first set 111 micromirrors is depicted as light beam 130, and light from the source directed towards the second set 121 of micromirrors is depicted as light beam 132. In general, light beams 130, 132 are from a single light source and have approximately the same magnitude and phase when they strike the reflective surfaces of the micromirrors 110, 120. As indicated above, when the planes of the two sets 111, 121 of micromirrors are aligned forming a common plane, i.e., the offset distance 114 between the sets 111, 121 of micromirrors is zero, the array 12 of micromirrors functions as a single reflective surface or, more specifically, a flat mirror. However, if the offset distance 114 between the sets 111, 121 of micromirrors is approximately one-quarter of a wavelength ($\lambda/4$) of the light frequency directed towards the array of micromirrors 12, then the reflected light of light beam 130 is approximately 180 degrees out of phase with the reflected light of light beam 132 resulting in destructive interference of the reflected light.

When the first set 111 of micromirrors is motionless, i.e., stationary, then as the offset distance 114 of the second set 121 of micromirrors varies between 0 and $\lambda/4$, light reflection respectively varies from full reflection to no reflection. Such a change in offset distance results in amplitude modulation of light and occurs when the position of the second set 121 micromirrors varies in response to a control signal. When the first set 111 of micromirrors and the second set 121 of micromirrors move together simultaneously, i.e., the sets of micromirrors move at the same velocity, in response to another control signal, then a light beam striking the array 12 of micromirrors is reflected as phase modulated light. When the first set 111 of micromirrors moves at a first velocity and the second set 121 of micromirrors move at a second velocity in response to yet another control signal, then a light beam striking the array 12 of micromirrors is reflected as a light beam having a combination of amplitude modulation and phase modulation. An exemplary embodiment of an SLM system 200 for providing forces for moving micromirrors in accordance with the present disclosure is depicted in FIG. 4.

Figure 3:
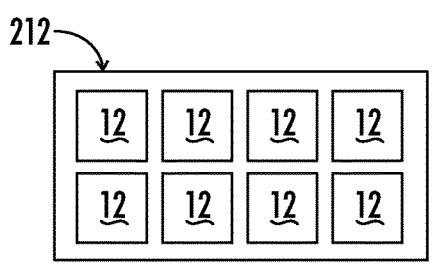
FIG. 3 depicts an exemplary embodiment of an array of pixels formed by the micromirrors of FIG. 2.

FIG. 3 depicts an embodiment of an array 212 of multiple pixels, wherein each pixel is implemented as an array 12 of micromirrors. The array 212 of multiple pixels as shown has a 2 by 4 grid of the arrays 12 of micromirrors. In other embodiments other pixel arrangements of arrays 12 of micromirrors are possible having different numbers of pixels. Each pixel 12 may be controlled by a separate controller (not shown in FIG. 3) according to the embodiment shown by FIG. 14 or otherwise. In other embodiments, a single controller can be used to control multiple pixels.

Figure 4:
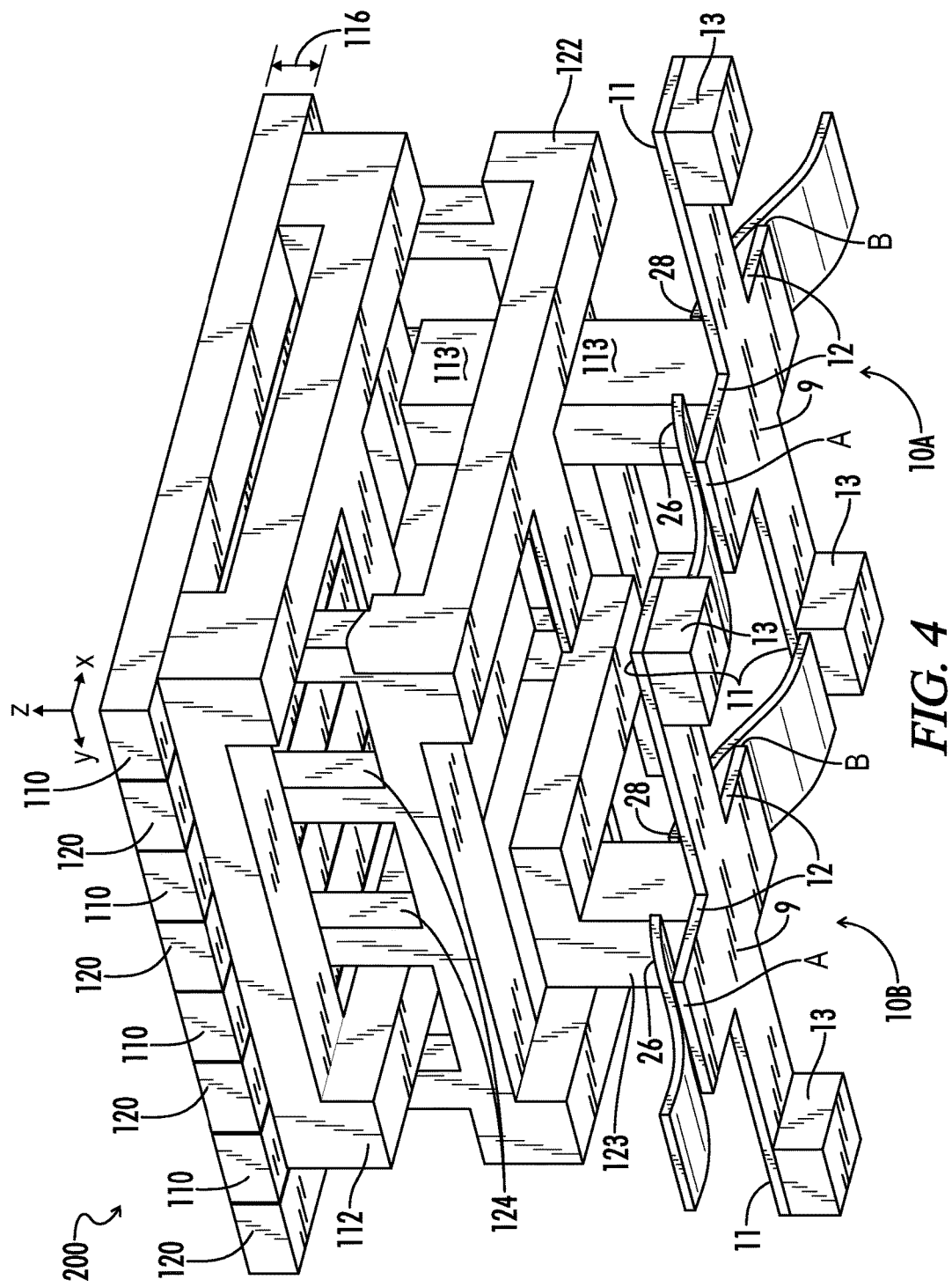
FIG. 4 depicts an exemplary spatial light modulation system with actuators for moving the micromirrors of FIG. 2.
Figure 5:
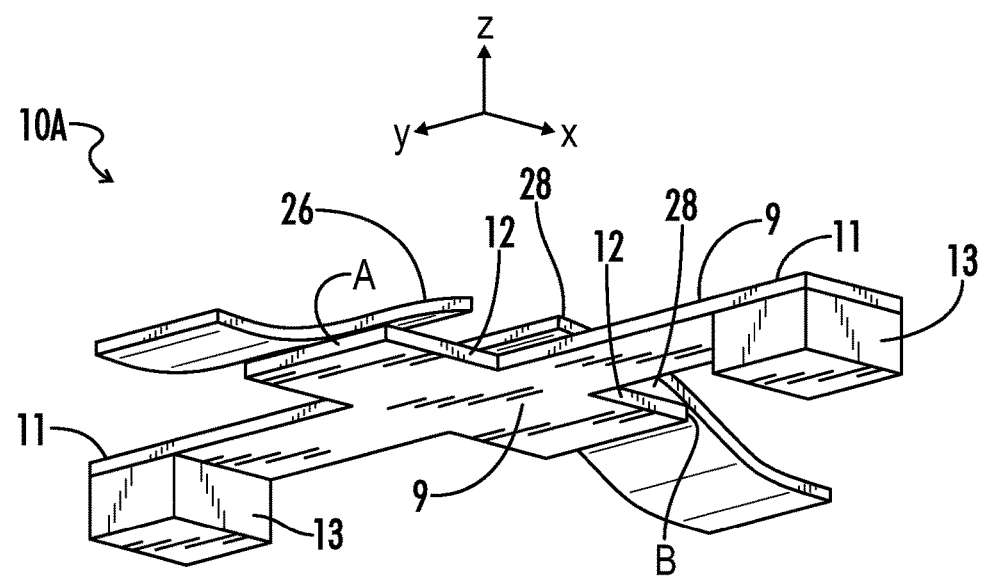
FIG. 5 depicts an exemplary embodiment of an actuator for the spatial light modulation system of FIG. 4.
Figure 9:
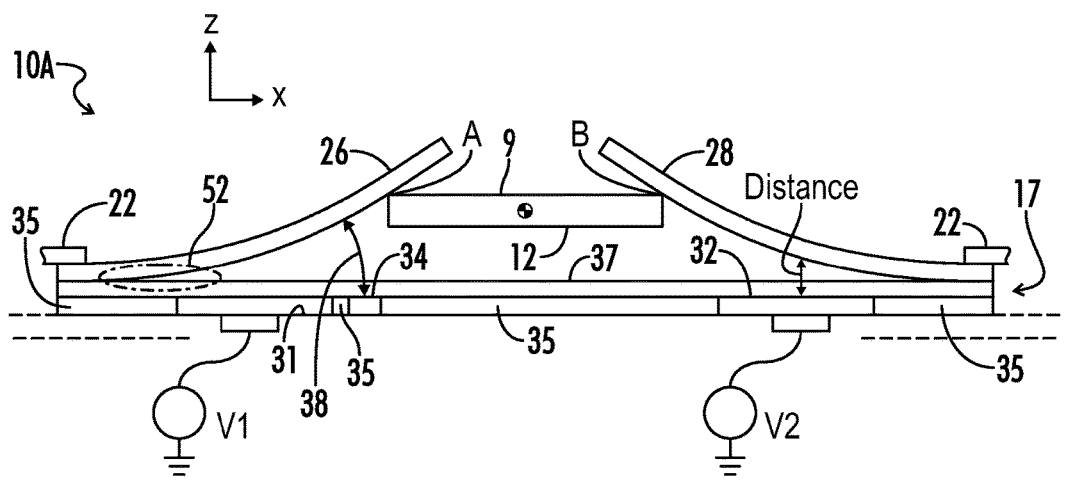
FIG. 9 depicts an exemplary embodiment of an actuator for the spatial light modulation system of FIG. 4 with the drive bar in a neutral position.
Figure 12:
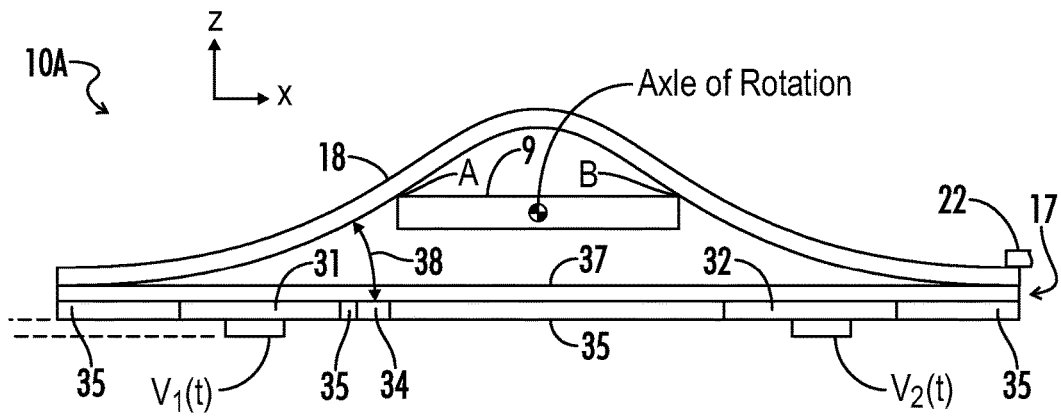
FIG. 12 depicts another exemplary embodiment of an actuator for the spatial light modulation system of FIG. 4.

FIG. 4 depicts a spatial light modulation system (SLMS) 200 comprising micromirrors 110, 120 coupled to actuators 10A, 10B for moving the micromirrors. Actuator 10A is shown in FIG. 5, and actuator 10B is identical to the actuator 10A shown in FIG. 5. Actuator 10A has a frame 112, and actuator 10B has a frame 122. The frames 112, 122 couple forces generated by the actuators 10A, 10B, respectively, to the micromirrors. As depicted in FIG. 4, micromirrors 110, 120 have their reflective surfaces aligned, i.e., there is no offset between the micromirrors. The bottom surfaces of micromirrors 110, 120 are resting on the top surface of the frame 112. When upward (the z direction) forces are applied by actuator 10A to the frame 112, the frame 112 moves micromirrors 110, 120 together in the z-direction. Such unison movement of the micromirrors 110, 120 phase modulates a light beam striking the micromirrors. Forces for moving the frame 112 are provided by the actuator 10A that is coupled to the frame 112 via post 113. Actuator 10A comprises a drive bar 9 resting on support posts 13 and contacting a pair of force ribbons 26, 28. At least one end of each force ribbon 26, 28 is attached to a substrate 17 (FIG. 12). The force ribbons 26, 28 as depicted apply forces to edges of the drive bar 9 as will be seen. Additional details of the force ribbon structure are shown in FIGS. 5, 9 and 12. Further, as will be described in more detail hereafter, it is possible to use a single force ribbon for a given actuator 10A, 10B instead a pair of ribbons 26, 28, as shown by FIG. 4.

The SLMS 200 of FIG. 4 may also provide amplitude modulation for light received by the reflection surfaces of micromirrors 110, 120. Assume that actuator 10A is and remains inactive, i.e., no forces are generated by actuator 10A and that the micromirrors 110, 120 are resting on the top surface of frame 112. Actuator 10B is coupled to the second frame 122. The frame 122 has fingers 124 extending upward (the z-direction) that are coupled to bottom surfaces of micromirrors 120. When fingers 124 are pushed upward in response to forces of actuator 10B, the offset between micromirrors 110 and micromirrors 120 changes from zero to another value in response to the forces moving frame 122. The amount of offset depends on the magnitude of the forces provided by actuator 10B and the geometry of frame 122. The forces of the actuator 10B are generated in response to electrical field forces of a control signal, which is applied to the control plates of the actuator 10B. Exemplary embodiments of an actuator 10A are described with particular reference to FIG. 9, FIG. 11, and FIG. 12 (noting that the support posts 13 are not shown in these figures for simplicity of illustration). When both actuators 10A and 10B receive control signals, light striking micromirrors 110, 120 may be simultaneously modulated with both amplitude modulation and phase modulation.

Figure 11:
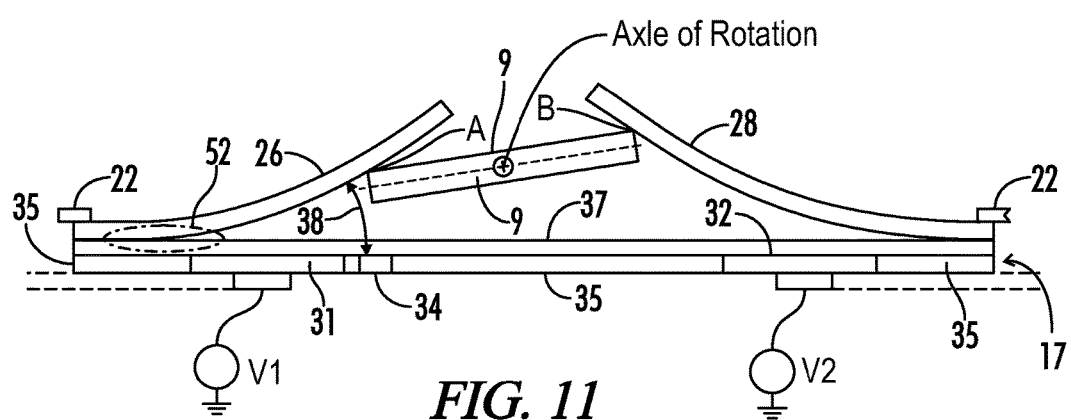
FIG. 11 depicts the actuator of FIG. 9 with the drive bar in a rotated position.

FIG. 5 depicts an exemplary embodiment of actuator 10A that provides forces for moving the micromirrors 110 of SLMS 200 as may be desired. The actuator 10B may similarly provide forces for moving the micromirrors 120. Actuator 10A comprises drive bar 9 having one end positioned on a top surface of support post 13 and another end coupled to a top surface of another support post 13. The bottom surface of each support post 13 is formed on a surface of a substrate 17 (FIG. 11).

The drive bar 9 as depicted has a rectangular cross section with a generally rectangular shape and a length in the y-direction. In the depicted embodiment, the drive bar 9 forms a pair of crossed beams. One beam 11, referred to herein as "longitudinal beam," has a longitudinal axis extending in the y-direction, and the other beam 12, referred to herein as "crossbeam," has a longitudinal axis in the x-direction that is perpendicular to the longitudinal axis of the beam 11. As shown by FIG. 5, the crossbeam 12 extends from a first edge, referred to herein as "edge A," to a second edge, referred to herein as "edge B." The crossbeam 12 as depicted rotates in response to forces applied by the force ribbons 26, 28. In other embodiments, the drive bar 9 may have other shapes and configurations. For some embodiments of the actuator 10A, crossbeam 12 may not be present. The drive bar 9 is fabricated of a material that provides a restoring force, a torque, that is generally in accordance with or an approximation to Hooke's Law. As depicted in FIG. 5, the drive bar 9 is in a neutral position, i.e., the drive bar 9 has not been forced to move about its axle of rotation.

When a force is applied by a force ribbon 26, 28 to an edge of the drive bar 9, such as edge A or edge B of the crossbeam 12, the drive bar 9 (including specifically the crossbeam 12) rotates from its neutral position to a new position based on the magnitude and direction of the applied force. The rotation of the drive bar 9 from its neutral position may be in the clockwise or the counterclockwise direction (seen looking in the y-direction) depending on a control signal. The electric field and resulting forces created by the control signal may have time-varying components. If the forces of the ribbon force 26, 28 are removed, such as when control signal voltage goes to zero, a restoring force based on Hooke's law tends to move the drive bar 9 back to its neutral position. As would be understood by those skilled in the art, the ends of the drive bar 9 attached to support post 13 do not rotate causing the drive bar 9 to twist during rotation. The torsional forces generated by the twisting tend to return the drive bar 9 back to its neutral position when electrostatic forces are removed. Such an embodiment of the drive bar 9 will be referred to herein as a "torsion bar." In other embodiments, other types of drive bars 9 are possible, such as, for example, a cantilevered beam.

As depicted in FIG. 5, one portion of the force ribbon 26 rests on edge A of crossbeam 12, and another portion of the force ribbon 28 rests on edge B of crossbeam 12. In one exemplary embodiment, each force ribbon 26, 28 is made of an electrically conductive material that is coupled to a first electrical potential (a voltage) of a control signal so that the entire force ribbon is essentially at the first electrical potential. The first electrical potential may be electrical ground, generally considered to be a reference voltage of zero volts. When a second electrical potential of the control signal is coupled to a control plate of the actuator 10A, electric field forces pull the force ribbon downward (the negative z-direction) causing the drive bar 9 to tilt. Details of the tilting or rotation of the drive bar 9 by the force ribbon are depicted in FIG. 12. In an exemplary embodiment, as shown by FIG. 12, a conductive control plate 31 (or other type of conductive element) is near edge A of crossbeam 12, and another control plate 32 (or other type of conductive element) is near edge B of crossbeam 12. The control plates 31, 32 are positioned to generate an electric field in response to voltages of the control signal. Insulators 35 are positioned between the control plates 31, 32 and a capacitor plate 34, as shown by FIG. 12. In addition, the control plates 31, 32 are covered by an insulator 37 in order to prevent them from making electrical contact with the force ribbons 26, 28 as they are pulled downward. Such an electrical contact is undesirable since the contact of a control plate with a force ribbon 26, 28 would extinguish the electrical field and its resulting forces. In addition, such electrical contact may cause electro-welding of the force ribbon to a control plate. The electric field interacts with the force ribbon and generates forces for rotation of the drive bar 9, as will be described in more detail hereafter. Details for exemplary locations of control plates 31, 32 are depicted in FIG. 9 and FIG. 12.

Figure 6:
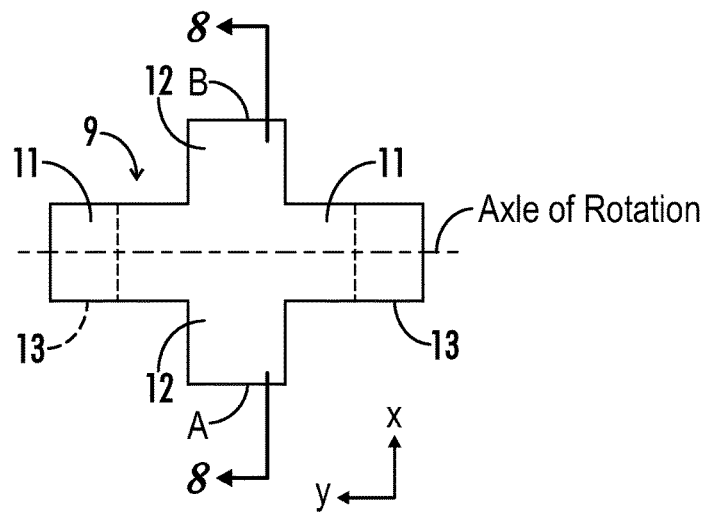
FIG. 6 depicts a top view of a drive bar for the exemplary actuator of FIG. 5.
Figure 7:
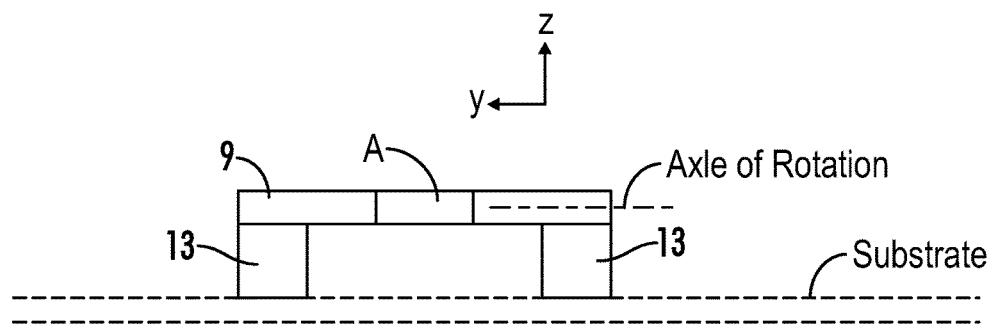
FIG. 7 depicts a front view of the drive bar for the exemplary actuator of FIG. 5.

A top view of an exemplary embodiment of the drive bar 9 is depicted in FIG. 6. The drive bar 9 comprises a longitudinal beam 11 having an essentially rectangular cross section that has one end coupled to support post 13 and the other end coupled to another support post 13. The longitudinal beam 11 has an axle of rotation that extends in the y-direction. The drive bar 9 also has a crossbeam 12 having edge A and edge B. Crossbeam 12 as depicted also has an essentially rectangular cross section, and the crossbeam 12 is perpendicular to the axle of rotation of the drive bar 9. As indicated above, each end of the longitudinal beam 11 is positioned on a support post 13. Each support post 13 is formed on a substrate 17 of the SLM system 200. A front view of the drive bar 9 of FIG. 6 is depicted in FIG. 7. FIG. 7 shows the drive bar 9 resting on support posts 13 and extending above a surface of the substrate. The space between a bottom surface of the drive bar 9 and the surface of the substrate allows the drive bar 9 to rotate several degrees, such as, for example, about ten degrees, without being obstructed due to contact with the substrate.

Figure 8A:
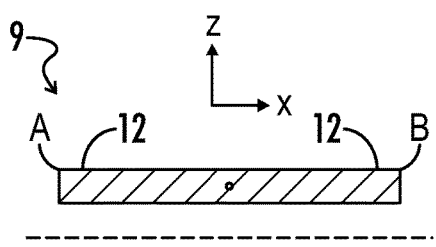
FIG. 8A depicts a section view of the drive bar in a neutral position for the exemplary actuator of FIG. 5.
Figure 8B:
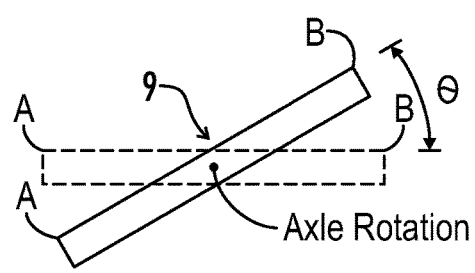
FIG. 8B depicts a section view of the drive bar in a rotated position for the exemplary actuator of FIG. 5.

FIG. 8A is a partial section view taken through the crossbeam 12 of drive bar 9 of FIG. 6. FIG. 8A shows the drive bar 9 in a neutral position, i.e., there is no rotation of the drive bar 9 about its axle of rotation. A downward force applied to edge A of crossbeam 12 by a force ribbon (not shown in FIG. 8A) causes the drive bar 9 to rotate in the counterclockwise direction as depicted in FIG. 8B. The angle of rotation, θ, of the drive bar 9 depends on the mechanical characteristics of drive bar 9 and on the magnitude of the force applied to edge A of the crossbeam 12 by the force ribbon.

Figure 10:
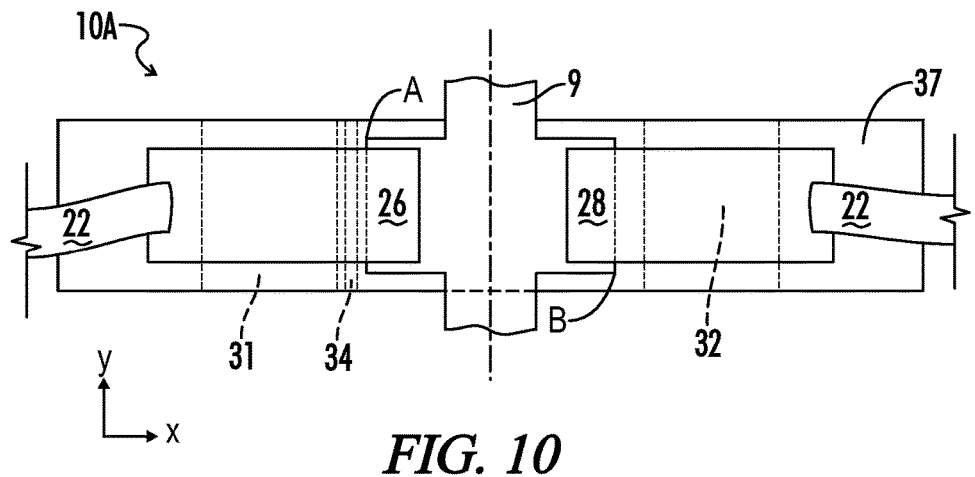
FIG. 10 is a top view of the actuator of FIG. 9.

FIG. 9 depicts an exemplary embodiment of actuator 10A of the present disclosure. A top view of the actuator 10A of FIG. 9 is depicted in FIG. 10. The force ribbons 26, 28 are made of a conductive material enabling all portions of the force ribbons 26, 28 to have approximately the same electrical potential. In one embodiment, both force ribbons 26, 28 are coupled to electrical ground via a conductive straps 22 placing force ribbons 26, 28 at an electrical potential of approximately zero volts. The first force ribbon 26 is adjacent to control plate 31 as illustrated on the left side of FIG. 9, and the second force ribbon 28 is adjacent to control plate 32 as illustrated on the right side of FIG. 9. An insulator 37 prevents the force ribbons 26, 28 from making electrical contact with their respective control plates 31, 32. The first force ribbon 26 rests on the edge A of crossbeam 12 of drive bar 9. The second force ribbon 28 rests on the edge B of crossbeam 12. For the embodiment depicted in FIG. 9, the two force ribbons 26, 28 each have one end resting on the substrate 17 and the other end resting on respective edge A or edge B of drive bar 9.

The first control plate 31 is located beneath (the negative z-direction) and close to the first force ribbon 26. As indicated above, the first force ribbon 26 rests on edge A of the crossbeam 12. A control signal has a first voltage, V1(t), coupled to the first control plate 31, and the control signal has a second voltage, V2(t), coupled to the second control plate 32. When V1(t) has a potential of zero voltage, the potential difference between the first control plate 31 and the first force ribbon 26 is approximately zero. When the potential difference between the first control plate 31 and the first force ribbon 26 is close to zero, a resulting electric field is about zero. When the electric field is zero, no forces are created for pulling the first force ribbon 26 against edge A of the drive bar 9. In such a condition, the drive bar 9 remains in its neutral position as illustrated in FIG. 9.

However, when V1(t) has a potential greater than zero volts, for example a few volts, then an electric field is created between the first control plate 31 and the first force ribbon 26. The electric field creates a downward force, a Coulomb force, on the first force ribbon 26. Specifically, this force attracts the ribbon 26 toward the control plate 31 and hence insulator 37, thereby causing the ribbon 26 to apply a force on the drive bar 9 on edge A that rotates the drive bar 9 in a counterclockwise direction as depicted in FIG. 11. As the ribbon 26 is pulled toward the surface defined by insulator 37, the distance between that surface and the ribbon 26 is decreased. As the ribbon 26 gets closer to the surface of insulator 37, stiction forces between the force ribbon 26 and the insulator 37 are combined with the electric field forces, also referred to as "electrostatic forces." Such a combination of stiction and electrostatic forces results in greater forces than are possible with electrical field forces acting alone. Aided by such stiction forces, the drive force for rotating the drive bar 9 is relatively low, thereby helping to increase the frequency response of the actuator 10A.

As the drive bar 9 rotates, portions of the force ribbon 26 within region 52 that do not contact the insulator 37 while the drive bar 9 is in the neutral position are forced closer to the insulator 37 and contact the insulator 37. Indeed, as the drive bar 9 rotates, a larger area of the force ribbon 26 contacts the insulator 37 thereby increasing the stiction forces. Such interaction helps to increase the frequency response of the actuator 10A. Conversely, when the drive bar 9 is rotated in the opposite direction in order to return it to or past its neutral position, such rotation of the drive bar 9 tends to pull the force ribbon 26 from the insulator 37. Indeed, as the drive bar 9 rotates causing separation between the insulator 37 and portions of the force ribbon 26 in the region 52, a smaller area of the force ribbon 26 contacts the insulator 37 thereby reducing the stiction forces trying to pull the force ribbon 26 toward the insulator 37. Such interaction also helps to increase the frequency response of the actuator 10A.

The force ribbon 28 may be similarly used to apply forces on the drive bar 9 for rotating it in a desired manner. In this regard, if the control signal applies a non-zero potential for V2(t) to the second control plate 32, an attractive force is created between the ribbon 28 and the control plate 32. Such force causes the ribbon 28 to apply a force on the drive bar 9 that tends to rotate the drive bar 9 in the clockwise direction. When the drive bar 9 is rotated in one direction, a drive force can be applied on the opposite side of the drive bar 9, overcoming the stiction forces, and causing the drive bar 9 to rotate in the opposite direction. As an example, when the drive bar 9 is rotated in the counterclockwise direction, as shown by FIG. 11, the voltage difference between the control plate 32 and the ribbon 28 may be increased in order to generate a force that rotates the drive bar 9 clockwise. Also, the voltage difference between the control plate 31 and the ribbon 26 may be decreased to facilitate the clockwise movement by reducing or eliminating the force applied on the drive bar 9 by the force ribbon 26.

It would be appreciated by those in the art that to provide a desired motion to the drive bar 9 that the control signal may vary V1(t) and V2(t) according to a control law. As would be known by those skilled in the art, the strength of the created electric fields are dependent on the value of applied voltage and on the distance between the force ribbons 26, 28 and their respective control plates, 31, 32. The forces produced by the electric fields are approximately proportional to their strength.

Figure 13:
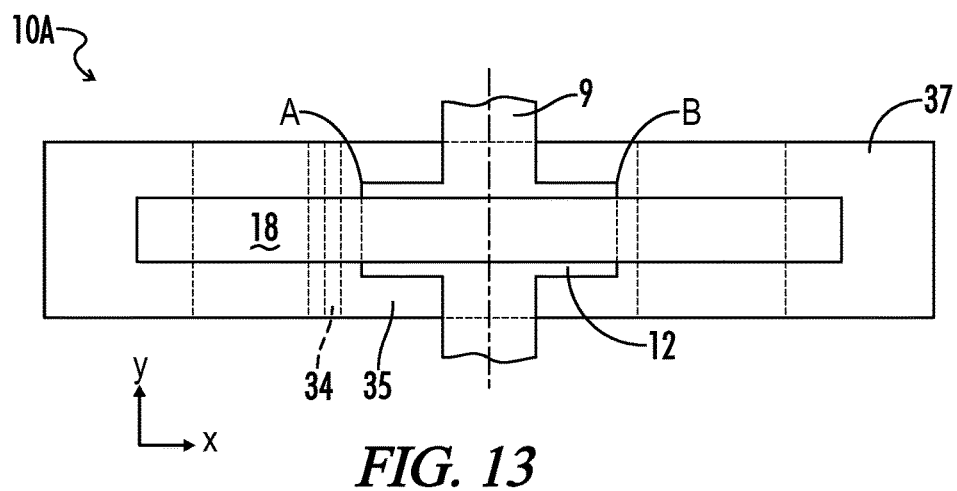
FIG. 13 is a top view of the actuator of FIG. 12.

FIG. 12 depicts another exemplary embodiment of the actuator 10A having a force ribbon 18, wherein the force ribbon 18 is attached to the insulator 37 on the left side of the actuator 10A and extends to and rests on edge A of the drive bar 9. The force ribbon 18 also extends from edge A of the drive bar 9 and rests on edge B of drive bar 9. From edge B of the drive bar 9, the force ribbon 18 extends to and is attached to the insulator 37 on the right side of the actuator 10A. In one embodiment, the force ribbon 18 is made of a conductive material and is connected via a conductive strap 22 to electrical ground. When a first voltage, V1(t), having a non-zero voltage, is applied to the first control plate 31, the force ribbon 18 pulls edge A downward in response to V1(t), causing drive bar 9 to rotate in the counterclockwise direction. Similarly, when a second voltage, V2(t), is applied to the second control plate 32, the drive bar 9 responds by rotating in the clockwise direction. A top view of actuator 10A of FIG. 12 is depicted in FIG. 13.

When a desired angle of rotation or angular velocity is desired, voltages V1(t) and V2(t) of the control signal vary according to a control law to provide the desired angle of rotation of the drive bar 9. Because the position of the drive bar 9 translates to positions of the micromirrors 110, 120, the control signal provides modulation of the reflected light beam striking the SLMS 200. The values of V1(t) and V2(t) of the control signal are created in response to the modulation requirements of the SLMS 200.

Using a force ribbon 18 that contacts the drive bar 9 at opposite ends, as shown by FIG. 12 may have various advantages relative to an embodiment, such as is depicted by FIG. 9 that has multiple force ribbons 26, 28. As an example, the force ribbon 18 can apply non-linear restoring forces that tend to increase the rotational speed of the drive bar 9. Also, there may be some manufacturing benefits that help to achieve a higher yield during manufacturing.

Figure 14:
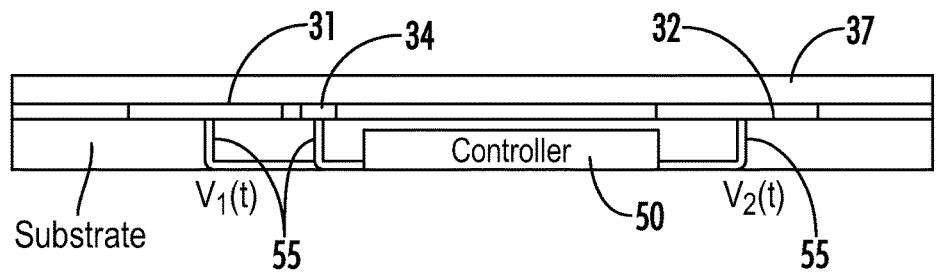
FIG. 14 depicts an embodiment of a controller mounted adjacent to control plates of an actuator.

An embodiment of a controller 50 for providing the control signal voltages, V1(t) and V2(t), is depicted in FIG. 14. The controller 50 is fabricated on a surface of the substrate 17. The controller 50 may comprise CMOS circuitry or other types of circuitry formed on one or more layers of the substrate 17. Signals are coupled to and from actuator 10A on conductors extending through vias 55 in the substrate 17. The controller 50, as depicted, is a dedicated controller providing control to respective actuators 10A, 10B of SLM 200. In other embodiments, it is possible that controller 50 may provide control functions to more than one SLM 200.

An exemplary embodiment of a feedback element for sensing rotation angle, θ, and the corresponding movement of micromirrors comprises a sensor capacitor whose capacitance changes in response to changes of the rotational angle of the drive bar. The sensor capacitor, $C_{sense}$, comprises a capacitor plate 34, located across from the force ribbon 18 or 26 as shown in FIG. 9 and FIG. 12. The force ribbon 18 (in FIG. 12) or 26 (in FIG. 9) serves as a second capacitor plate for the sensor capacitor. It is well known to those in the art that a capacitance of a capacitor is approximately inversely proportional to the distance between the plates and directly proportional to the size of the plates. Hence, the angle of rotation is determinable by measuring the capacitance defined by capacitor plate 34 and the force ribbon 18 or 26. The capacitor plate 34 is separated from the force ribbon 18 or 26 by a plate separation distance 38. As the drive bar 9 rotates, the distance 38 changes thereby changing the capacitance between the capacitor plate 34 and the force ribbon 18 or 26. Thus, the measured capacitance is indicative of the distance 38 and, therefore, the angular position of the drive bar 9. In another embodiment, other portions of the actuator, such as a portion of the drive bar 9, may serve as a second capacitor plate. Other geometries are possible to form a capacitor that senses the rotational position of the drive bar 9.

Figure 15:
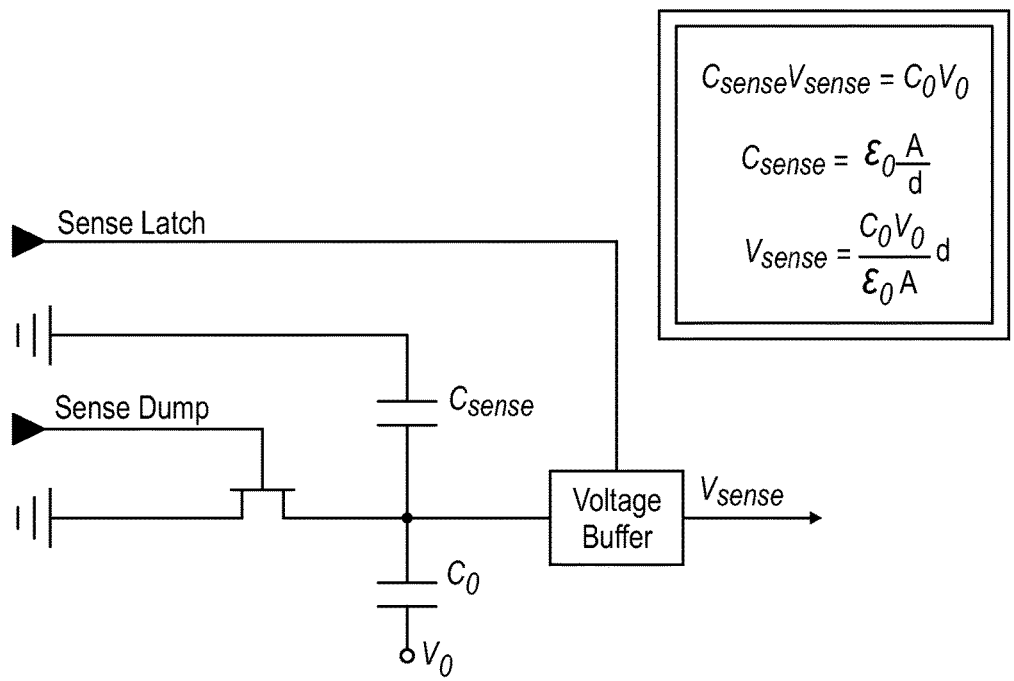
FIG. 15 depicts an embodiment of a sensor circuit for detecting drive bar rotational information for the spatial light modulator of FIG. 4.

A sense circuit may be coupled to $C_{sense}$ and provide a sense voltage, $V_{sense}$, that represents the angular position, θ, and may be input to the controller 50, which uses such input to determine the appropriate voltage of the control signal for rotating the drive bar 9 in a desired manner. An embodiment of a sense circuit for converting $C_{sense}$ to a voltage is depicted in FIG. 15. For small angles, of approximately 5 degrees or less, the linear displacement of micromirrors is directly proportional to the angular displacement of the drive bar 9. The modulation light reflected from the micromirrors is at the same frequency of the angular frequency of the drive bar 9. This is best understood by referring to FIG. 4 where frame 112 is positioned on the drive bar 9 and supports micromirrors that are positioned on the frame 112. Hence, when the frame 112 moves at the angular frequency of drive bar 9, the linear frequency of the micromirrors has the same frequency.

An exemplary use and operation of the actuator 10A shown by FIG. 9 will now be described in more detail below.

For illustrative purposes, assume that the drive bar 9 is in a neutral position as shown by FIG. 9. Further, assume that it is desirable to rotate the drive bar 9 counterclockwise to a desired angular position, as shown by FIG. 11, such that rotation of the drive bar 9 moves a MEMS structure, such as a frame 112 and an array of micromirrors as shown by FIG. 4, a desired distance. In such an example, the controller 50 provides a control signal via the force ribbon 26 and the conductive plate 31 at a voltage that creates a sufficient voltage potential across these components in order to generate electrostatic forces for attracting the force ribbon 26 toward the conductive plate 31. As the force ribbon 26 moves toward the conductive plate 31, the force ribbon 26 moves closer to the surface of the insulator 37, and portions of the force ribbon 26 within area 52 that previously were separated from the insulator 37 when the drive bar 9 was in the neutral position contact the surface of the insulator 37. Thus, as the drive bar 9 rotates, more area of the force ribbon 26 contacts the insulator 37. The movement of the force ribbon 26 and the additional area of contact between the force ribbon 26 and the insulator 37 increase stiction between the force ribbon 26 and the insulator 37 further increasing the forces that pull the force ribbon 26 toward the conductive plate 31 and insulator 37.

The electrostatic and stiction forces acting on the force ribbon 26 cause it to press on the drive bar 9 at edge A resulting in counterclockwise rotation of the drive bar 9. As the drive bar 9 rotates and the force ribbon 26 moves closer to the insulator 37, the distance 38 of the force ribbon 26 from the capacitor plate 34 decreases thereby changing the capacitance between the force ribbon 26 and the capacitor plate 34. A measurement of this capacitance is provided to the controller 50, which uses the capacitance to determine the angular position of the drive bar 9 during rotation. Using this feedback, the controller 50 appropriately adjusts the control signal so that the drive bar 9 is precisely rotated to the desired angular position.

For illustrative purposes assume that it is desirable to rotate the drive bar 9 clockwise from the angular position shown by FIG. 11. In such state, the drive bar 9 has previously been rotated counterclockwise from the neutral position creating torsional stresses in the drive bar 9 that tend to move the drive bar 9 back to the neutral position. Thus, the drive bar 9 can be rotated clockwise simply by adjusting the control signal such that the voltage potential between the force ribbon 26 and the conductive plate 31 is decreased. An effect of this action is to reduce the electrostatic forces attracting the force ribbon 26 to the conductive plate 31 such that the torsional forces are sufficient to rotate the drive bar 9 clockwise. As the drive bar 9 rotates, the force ribbon 26 moves away from the insulator 37 separating portions of the force ribbon 26 in region 52 from the insulator 37. These actions have the effect of reducing stiction between the force ribbon 26 and the insulator 37 helping to increase the rotational speed of the drive bar 9. This speed can be further enhanced by applying a control signal across the force ribbon 28 and the conductive plate 32 for generating electrostatic forces that pull the force ribbon 28 toward the conductive plate 32. Such action causes the force ribbon 28 to press on the drive bar 9 at edge B thereby increasing the forces that rotate the drive bar 9 clockwise. As with the force ribbon 26, movement of the force ribbon 28 toward the insulator 37 increases stiction between the force ribbon 28 and the insulator 37 so that rotational speed is further enhanced. If desired, the control signals may be adjusted so that the drive bar 9 rotates clockwise past the neutral position. Thus, various angular positions of the drive bar 9 are achievable in both clockwise and counterclockwise directions from the neutral position shown by FIG. 9.

In various embodiments described above, actuators 10A, 10B are used in a spatial light modulator system. It is possible for the actuators 10A, 10B to be used in other applications including other types of microfabricated systems for controlling the movement of components of such systems in a desired manner. The actuators and frames of the present disclosure are capable of providing movement greater than 10 microns.

Although the present disclosure has been described above in terms of specific embodiments, it is anticipated that alterations and modifications thereof will become apparent to those skilled in the art. It is therefore intended that the following claims be interpreted as covering all such alterations and modifications as fall within the spirit and scope of the disclosure.

Now, therefore, the following is claimed:

1. A microelectromechanical systems (MEMS) actuator, comprising:
    a substrate having an insulator and having a conductive element for receiving a control signal;
    a support post positioned on the substrate;
    a drive bar positioned on the support post;
    a MEMS structure positioned on the drive bar such that the MEMS structure moves in response to rotation of the drive bar;
    a conductive force ribbon contacting the drive bar and the substrate; and
    a controller coupled to the conductive element and the conductive force ribbon for applying the control signal to the conductive element and the conductive force ribbon, wherein the control signal provides an electric field that generates an electrostatic force for attracting the force ribbon toward the conductive element thereby causing the force ribbon to apply a force to the drive bar for rotating the drive bar, wherein stiction between the force ribbon and the insulator increases a rotational speed of the drive bar as the drive bar rotates about the support post, and wherein the force ribbon is positioned such that a portion of the force ribbon contacts a surface of the insulator in response to the electrostatic force thereby increasing the stiction.

2. The MEMS actuator of claim 1, wherein the drive bar has a first end and a second end, wherein the force ribbon contacts the first end and the second end, wherein the force is applied to the drive bar at the first end for rotating the drive bar in a first rotational direction, wherein the substrate has a second conductive element for receiving a second control signal, and wherein the second control signal provides an electric field that generates an electrostatic force for attracting the force ribbon toward the second conductive element thereby causing the force ribbon to apply a force to the drive bar at the second end for rotating the drive bar in a second rotational direction that is opposite to the first rotational direction.

3. The MEMS actuator of claim 2, wherein the stiction between the force ribbon and the insulator increases the rotational speed of the drive bar as the drive bar rotates about the support post in the first rotational direction, and wherein stiction between the force ribbon and a component of the MEMS actuator increases a rotational speed of the drive bar as the drive bar rotates about the support post in the second rotational direction.

4. The MEMS actuator of claim 1, further comprising a second conductive force ribbon, wherein the drive bar has a first end and a second end, wherein the second conductive force ribbon contacts the second end, wherein the force is applied to the drive bar at the first end for rotating the drive bar in a first rotational direction, wherein the substrate has a second conductive element for receiving a second control signal, and wherein the second control signal provides an electric field that generates an electrostatic force for attracting the second conductive force ribbon toward the second conductive element thereby causing the second conductive force ribbon to apply a force to the drive bar at the second end for rotating the drive bar in a second rotational direction that is opposite to the first rotational direction.

5. The MEMS actuator of claim 1, wherein the MEMS structure comprises a micromirror.

6. The MEMS actuator of claim 5, wherein the micromirror moves by a distance greater than 10 microns for modulating light.

7. The MEMS actuator of claim 1, further comprising:
    a feedback element configured to transmit to the controller information indicative of rotational movement of the drive bar,
    wherein the controller is configured to provide the control signal based on the information.

8. The MEMS actuator of claim 7, wherein the feedback element comprises a capacitor for measuring rotation of the drive bar.

9. The MEMS actuator of claim 1, wherein the surface contacted by the portion of the force ribbon in response to the electrostatic force is flat.

10. A microelectromechanical systems (MEMS) actuator, comprising:
    a conductive element;
    a drive bar for moving a MEMS structure in response to rotation of the drive bar;
    a conductive force ribbon contacting the drive bar, and
    an insulator positioned between the conductive element and the force ribbon,
    wherein a voltage difference between the force ribbon and the conductive element generates an electrostatic force for attracting the force ribbon toward the conductive element thereby causing the force ribbon to apply a force on the drive bar for rotating the drive bar, and wherein the electrostatic force and stiction between the force ribbon and the insulator press the force ribbon against the insulator, wherein the force ribbon is positioned such that a portion of the force ribbon contacts a surface of the insulator in response to the electrostatic force thereby increasing the stiction.

11. The MEMS actuator of claim 10, wherein the MEMS structure comprises a mirror for modulating light directed toward the micromirror.

12. The MEMS actuator of claim 11, wherein the micromirror is arranged to independently modulate amplitude and phase of the light.

13. The MEMS actuator of claim 10, further comprising a feedback element for sensing movement of the drive bar.

14. The MEMS actuator of claim 13, wherein the feedback element is capacitive.

15. The MEMS actuator of claim 10, wherein the surface contacted by the portion of the force ribbon in response to the electrostatic force is flat.

16. A method for actuating a microelectromechanical systems (MEMS) structure, comprising:
applying a voltage difference between a conductive element and a conductive force ribbon thereby generating an electric field that generates an electrostatic force for attracting the force ribbon toward the conductive element such that the electrostatic force and stiction press the force ribbon against an insulator, thereby causing the force ribbon to apply a force on a drive bar, wherein the electrostatic force causes a portion of the force ribbon to contact a surface of the insulator thereby increasing the stiction;
rotating the drive bar in response to the force applied on the drive bar; and
moving the MEMS structure in response to the rotating.

17. The method of claim 16, wherein the rotating causes the drive bar to rotate in a first rotational direction, and wherein the method further comprises:
applying a voltage difference between a second conductive element and the force ribbon thereby generating an electric field that generates an electrostatic force for attracting the force ribbon toward the second conductive element, thereby causing the force ribbon to apply a second force on the drive bar; and
rotating the drive bar in a second rotational direction that is opposite to the first rotational direction in response to the second force.

18. The method of claim 16, wherein the rotating causes the drive bar to rotate in a first rotational direction, and wherein the method further comprises:
applying a voltage difference between a second conductive element and a second conductive force ribbon thereby generating an electric field that generates an electrostatic force for attracting the second conductive force ribbon toward the second conductive element, thereby causing the second conductive force ribbon to apply a second force on the drive bar; and
rotating the drive bar in a second rotational direction that is opposite to the first rotational direction in response to the second force.

19. The method of claim 16, wherein the MEMS structure comprises a micromirror, and wherein the method further comprises modulating light via the micromirror.

20. The method of claim 16, further comprising:
sensing movement of the drive bar; and
controlling the voltage difference based on the sensing.

21. The method of claim 20, wherein the sensing is performed via a capacitive feedback element.

22. The method of claim 16, wherein the surface contacted by the portion of the force ribbon is flat.

23. A method for actuating a microelectromechanical systems (MEMS) structure, comprising:
applying at least one voltage difference between at least one conductive element and at least one conductive force ribbon thereby generating an electric field that generates an electrostatic force for attracting the at least one force ribbon toward the at least one conductive element such that the electrostatic force and stiction press the at least one force ribbon against at least one insulator, thereby causing the at least one force ribbon to apply a force at a first point on a drive bar, wherein the electrostatic force causes a portion of the force ribbon to contact a surface of the insulator thereby increasing the stiction;
rotating the drive bar in a first direction in response to the force applied at the first point on the drive bar;
moving the MEMS structure in response to the rotating the drive bar in the first direction;
controlling the at least one voltage difference such that the at least one force ribbon applies a force at a second point on the drive bar;
rotating the drive bar in a second direction opposite to the first direction in response to the force applied at the second point on the drive bar; and
moving the MEMS structure in response to the rotating the drive bar in the second direction.

24. The method of claim 23, wherein the surface contacted by the portion of the force ribbon is flat.

25. A microelectromechanical systems (MEMS) actuator, comprising:
a substrate having an insulator, a first conductive element for receiving a first control signal, and a second conductive element for receiving a second control signal;
a support post positioned on the substrate;
a drive bar positioned on the support post, drive bar having a first end and a second end;
a MEMS structure positioned on the drive bar such that the MEMS structure moves in response to rotation of the drive bar;
a conductive force ribbon contacting the substrate and the first end and the second end of the drive bar; and
a controller coupled to the first conductive element and the conductive force ribbon for applying the first control signal to the first conductive element and the conductive force ribbon, wherein the first control signal provides an electric field that generates an electrostatic force for attracting the force ribbon toward the first conductive element thereby causing the force ribbon to apply a force to the drive bar at the first end for rotating the drive bar in a first rotational direction, wherein stiction between the force ribbon and the insulator increases a rotational speed of the drive bar as the drive bar rotates about the support post, wherein the second control signal provides an electric field that generates an electrostatic force for attracting the force ribbon toward the second conductive element thereby causing the force ribbon to apply a force to the drive bar at the second end for rotating the drive bar in a second rotational direction that is opposite to the first rotational direction, wherein the stiction between the force ribbon and the insulator increases the rotational speed of the drive bar as the drive bar rotates about the support post in the first rotational direction, wherein stiction between the force ribbon and a component of the MEMS actuator increases a rotational speed of the drive bar as the drive bar rotates about the support post in the second rotational direction, and wherein the force ribbon is positioned such that a portion of the force ribbon contacts a surface of the insulator in response to the electrostatic force for attracting the force ribbon toward the conductive element.

26. The MEMS actuator of claim 25, wherein the electrostatic force for attracting the force ribbon toward the second conductive element causes the portion of the force ribbon to separate from the surface of the insulator.

27. The MEMS actuator of claim 26, wherein the surface contacted by the portion of the force ribbon is flat.

\* \* \* \* \*